(12) United States Patent
Abougamia

(10) Patent No.: US 12,041,120 B2
(45) Date of Patent: Jul. 16, 2024

(54) 5G SERVICE BASED ARCHITECTURE (SBA) COMMUNICATION BASED ON MACHINE LEARNING

(71) Applicant: RAKUTEN MOBILE, INC., Tokyo (JP)

(72) Inventor: Mohamed Ahmed Ali Abdelfattah Abougamia, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/630,713

(22) PCT Filed: Dec. 28, 2021

(86) PCT No.: PCT/US2021/065282
§ 371 (c)(1),
(2) Date: Jan. 27, 2022

(87) PCT Pub. No.: WO2023/129129
PCT Pub. Date: Jul. 6, 2023

(65) Prior Publication Data
US 2024/0056495 A1    Feb. 15, 2024

(51) Int. Cl.
*H04L 67/1004*    (2022.01)
*H04L 41/06*    (2022.01)

(52) U.S. Cl.
CPC ........ *H04L 67/1004* (2013.01); *H04L 41/06* (2013.01)

(58) Field of Classification Search
CPC . H04L 67/1004; H04L 41/06; H04L 41/0893; H04L 41/5096; H04L 67/1008
See application file for complete search history.

(56) References Cited

U.S. PATENT DOCUMENTS

| 2020/0136911 | A1 | 4/2020 | Assali et al. |
| 2020/0186433 | A1* | 6/2020 | Cui ................... H04L 41/16 |
| 2021/0392197 | A1* | 12/2021 | Yang ................ H04L 67/306 |
| 2022/0131945 | A1* | 4/2022 | Sapra ................ H04L 41/08 |

FOREIGN PATENT DOCUMENTS

WO    2019/215308 A1    11/2019

OTHER PUBLICATIONS

Written Opinion of the International Searching Authority dated Apr. 1, 2022 in International Application No. PCT/US/2021/065282.
International Search Report dated Apr. 1, 2022 in International Application No. PCT/US/2021/065282.

* cited by examiner

*Primary Examiner* — Benjamin M Thieu
(74) *Attorney, Agent, or Firm* — Sughrue Mion, PLLC

(57) ABSTRACT

A method, system, and storage medium are provided. The method may include receiving, by a network repository function (NRF), registration information of each of a plurality of network functions (NFs), determining, by the NRF, load balance prioritization information for the plurality of NFs based on the received registration information, and transmitting, by the NRF to a service mesh control plane, the load balance prioritization information. The service mesh control plane may be configured to perform load balancing on the plurality of NFs based on the load balance prioritization information.

11 Claims, 10 Drawing Sheets

5G SERVICE BASED ARCHITECTURE (SBA) COMMUNICATION BASED ON MACHINE LEARNING

BACKGROUND

1. Field

The disclosure relates to a system and method for communication forwarding and control, load balancing and failure management in 5G service based architecture (SBA).

2. Description of Related Art

A $5^{th}$ generation (5G) core network is standardized by the $3^{rd}$ generation partnership project (3GPP) based on service based architecture (SBA), which means that each element (e.g., each network function (NF)) offers a standard service and may be referred to as a "producer." The service may be consumed by other NFs referred to as a "consumer." There exists a need for improved load balancing and failure management in SBA.

SUMMARY

According to an aspect of the disclosure, a method may include receiving, by a network repository function (NRF), registration information of each of a plurality of network functions (NFs), determining, by the NRF, load balance prioritization information for the plurality of NFs based on the received registration information, and transmitting, by the NRF to a service mesh control plane, the load balance prioritization information. The service mesh control plane may be configured to perform load balancing on the plurality of NFs based on the load balance prioritization information.

According to an aspect of the disclosure, a system may include a plurality of NFs, an NRF, and a service mesh control plane. The NRF may be configured to receive registration information of each of the plurality of NFs, determine load balance prioritization information for the plurality of NFs based on the received registration information, and transmit, to the service mesh control plane, the load balance prioritization information. The service mesh control plane may be configured to perform load balancing on the plurality of NFs based on the load balance prioritization information.

According to an aspect of the disclosure, a non-transitory computer readable storage medium may be connected to one or more processors and may store instructions that, when executed, cause the one or more processors to receive, by an NRF, registration information of each of a plurality of NFs, determine, by the NRF, load balance prioritization information for the plurality of NFs based on the received registration information, and transmit, by the NRF to a service mesh control plane or a Service Communication Proxy (SCP), the load balance prioritization information. The service mesh control plane or the SCP may be configured with Machine Learning to perform communication message forwarding and control and load balancing on the plurality of NFs based on the load balance prioritization information.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
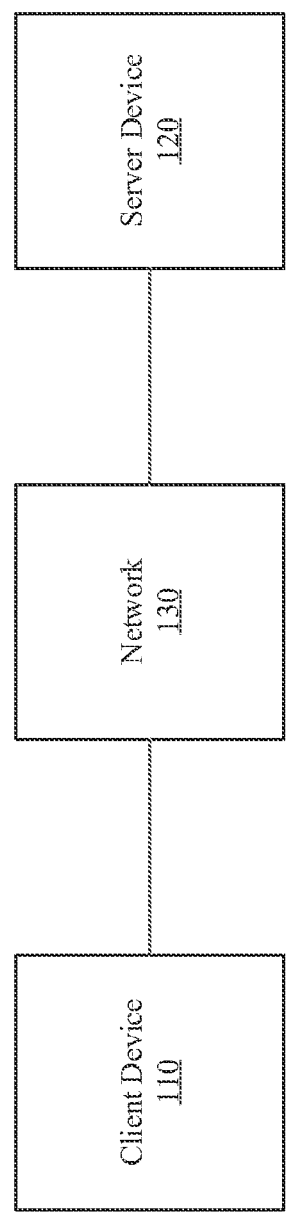
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

According to an embodiment, the client device 110 may correspond to user equipment (UE), the network 130 may correspond to a radio access network (RAN), and the server device 120 may correspond to a core network (e.g., 5G core network) for a telecommunication system (or one or more devices of the core network).

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
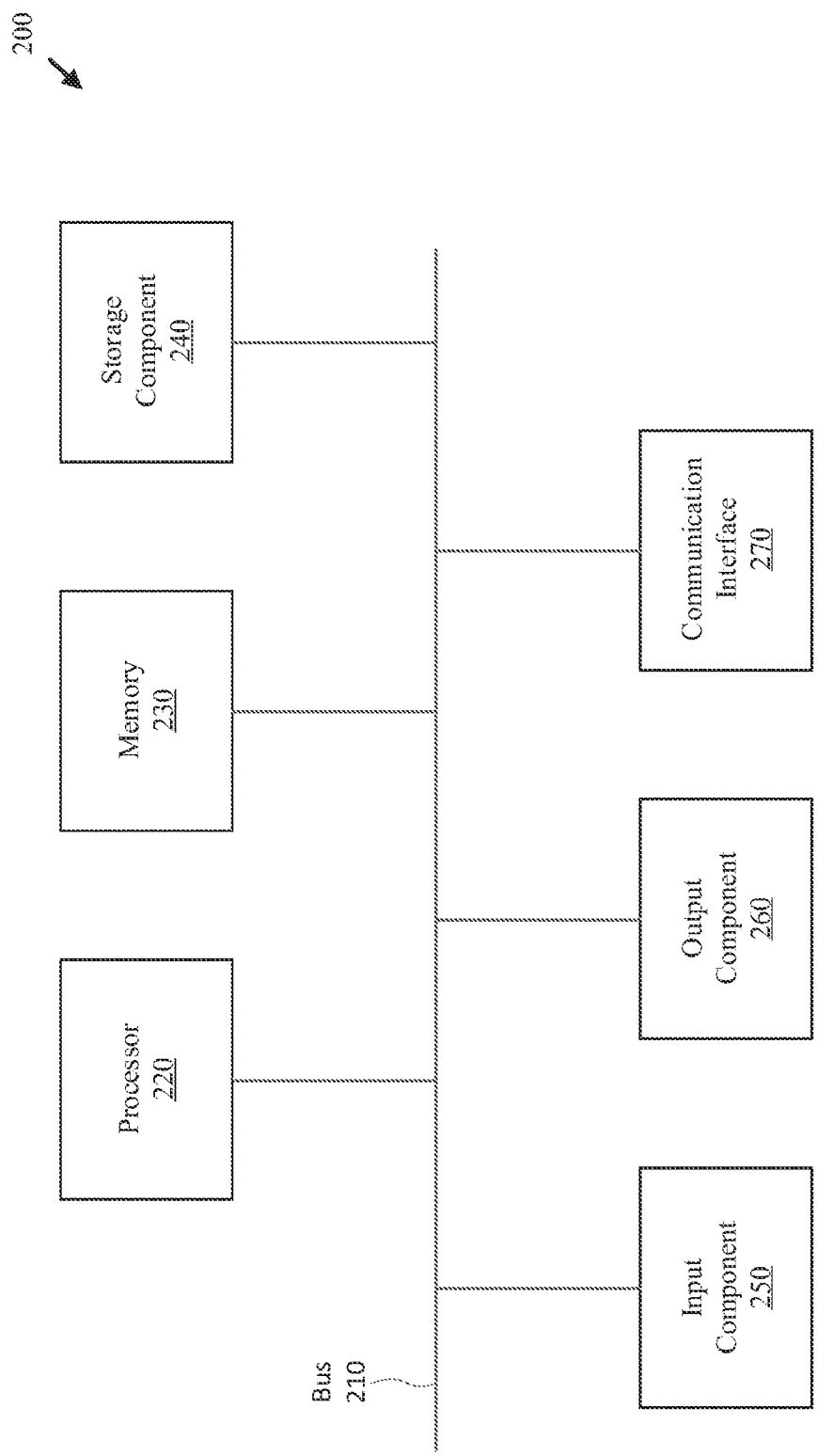
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 3:
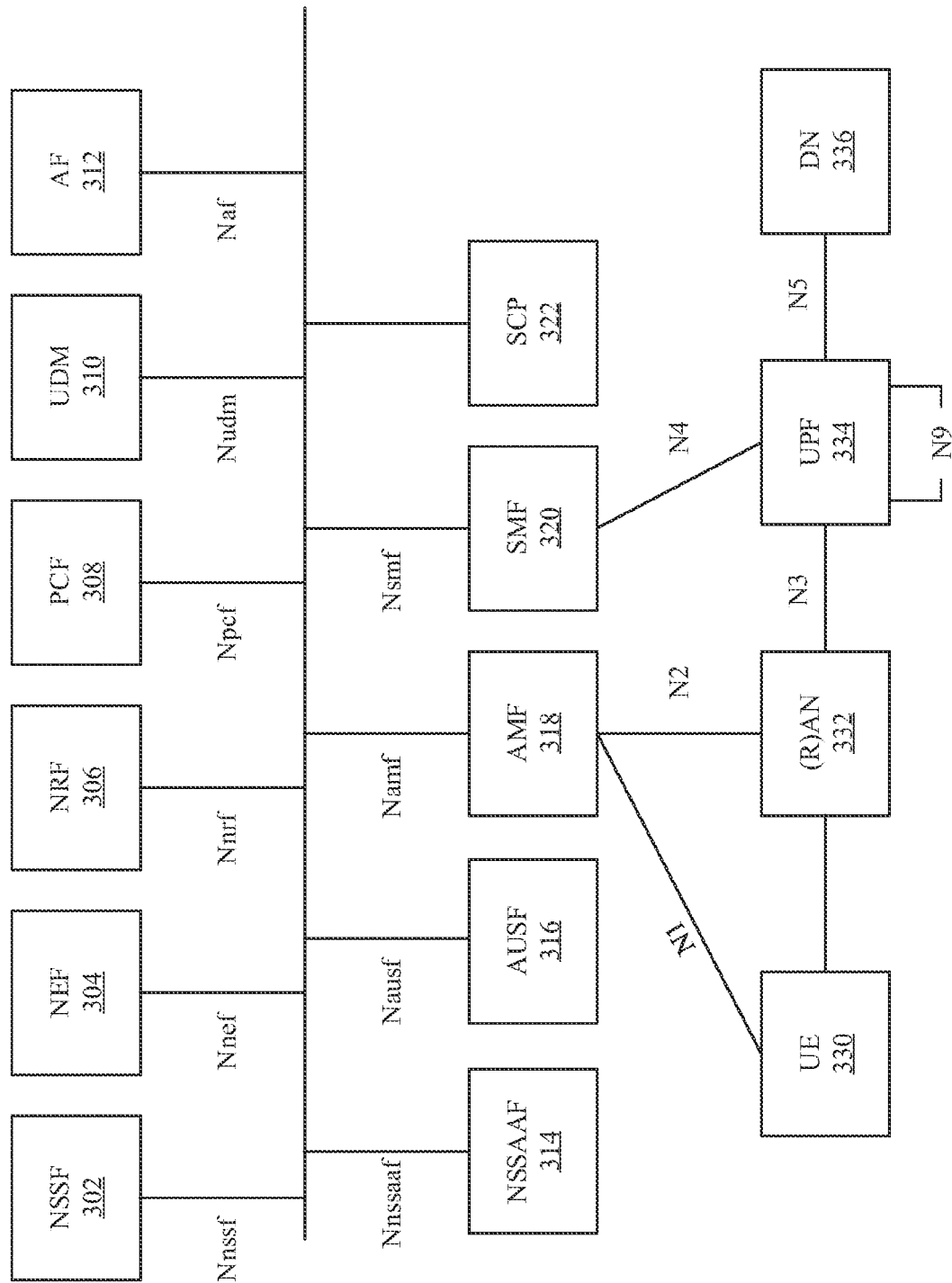
FIG. 3 is a diagram of a $5^{th}$ generation (5G) core $3^{rd}$ generation partnership project (3GPP) system architecture, according to an embodiment.

FIG. 3 is a diagram of a 5G core 3G partnership project (3GPP) system architecture, according to an embodiment. The architecture may include a plurality of network functions (NFs), such as a network slice selection function (NSSF) 302 connected via an Nnssf interface, a network exposure function (NEF) 304 connected via an Nnef interface, a network repository function (NRF) 306 connected via an Nnrf interface, a policy control function (PCF) 308 connected via an Npcf interface, a unified data management (UDM) function 310 connected via an Nudm interface, an application function (AF) 312 connected via an Naf interface, a network slice specific authentication and authorization function (NSSAAF) 314 connected via an Nnssaaf interface, an authentication server function (AUSF) 316 connected via an Nausf interface, an access and mobility management function (AMF) 318 connected via an Namf interface, and a session management function (SMF) 320 connected via an Nsmf interface. The NFs depicted are exemplary and not exclusive, as other NFs may be included in the SBA as will be understood by one of skill in the art from the disclosure herein.

The architecture may also include a service communications proxy (SCP) 322, which may be configured to intercept communication with other NFs and the NRF, and may have a standard communication with the NRF to perform networking control, load balancing, and fault detection. A user equipment (UE) 330 may be connected to the AMF 318 by an N1 interface and may be connected to the system generally by an access network, such as a radio access network (RAN) 332. The AMF 318 may be connected to the RAN 332 via an N2 interface. A user plane function (UPF) 334 may be connected to the RAN 332 via and N3 interface, to a data network (DN) via an N5 interface, and to the SMF 320 via an N4 interface. The UPF 334 may include an N9 interface.

Figure 4:
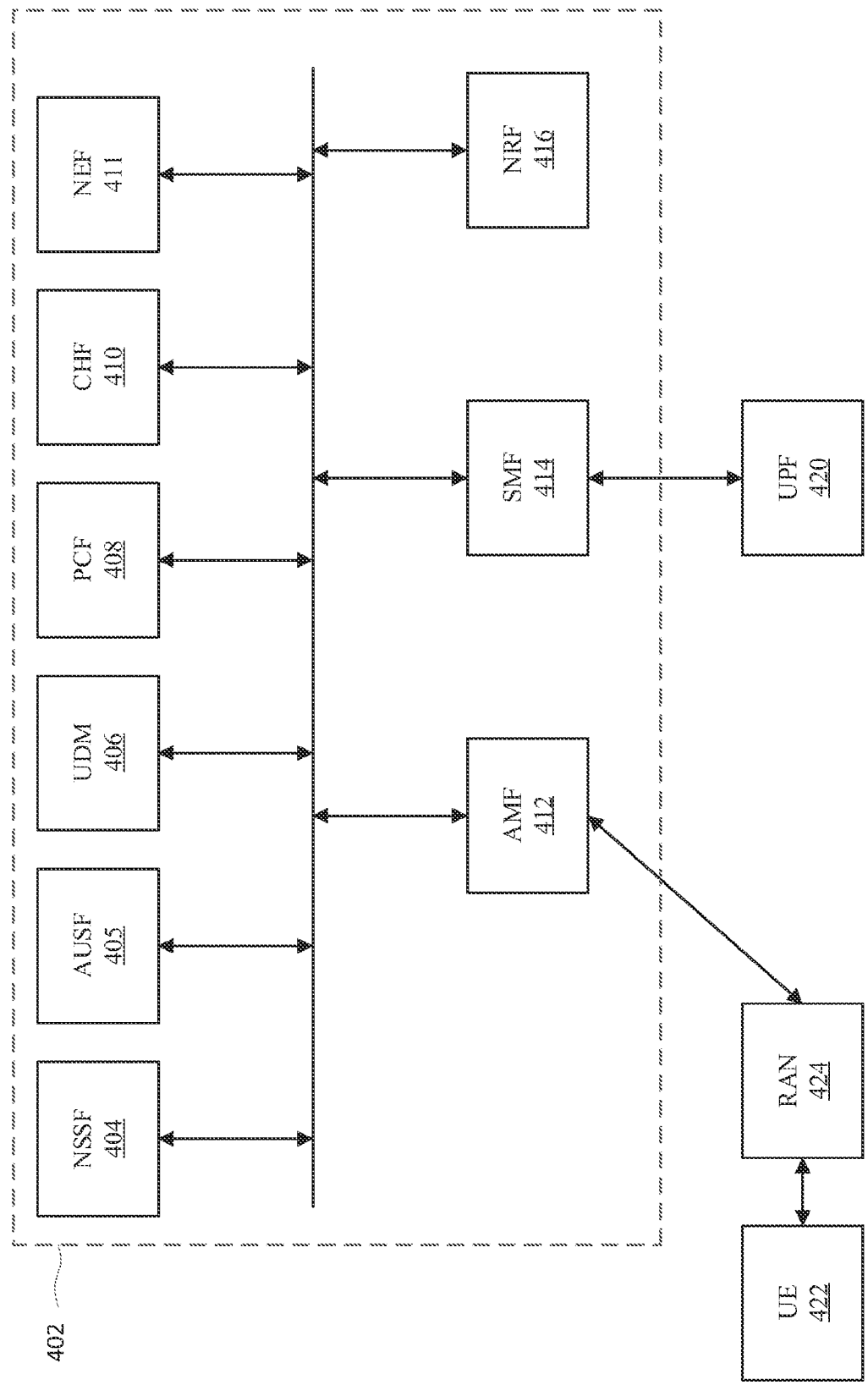
FIG. 4 is a diagram of a 5G core 3GPP service based architecture (SBA)

FIG. 4 is a diagram of a 5G core 3GPP service based architecture (SBA). The SBA 402 may include, for example, a plurality of NFs, such as an NSSF 404, an AUSF 405, a UDM 406, a PCF 408, a charging function (CHF) 410, an NEF 411, an AMF 412, and an SMF 414. It will be understood by one of ordinary skill in the art that the examples disclosed herein are not limited to the particular depicted NFs, as an SBA may include additional or alternative NFs. The SMF 414 may be in communication with a UPF 420, and a UE 422 may be in communication with the SBA 402 via a RAN 424. The SBA 402 includes an NRF 416.

An NRF operates such that each network element or NF in the 5G core SBA registers in the NRF before starting its respective operation (e.g., the NF sends registration information). The registration may include information about the NF, including the function, the NF frequency domain name (FQDN) or internet protocol (IP) address, the NF location, the NF priority, the NF capacity, the NF loading capabilities, the NF services, and/or other information as will be understood by one of ordinary skill in the art from the disclosure herein.

When a consumer NF attempts to use one of the services, the consumer NF sends an inquiry (e.g., a discover message) to the NRF regarding which producer NF is available and can provide the service. The NRF replies with a producer NF including its FQDN and/or IP address, and the NRF may select the producer NF based on predetermined rules of operator choice, such as capacity, priority, locality, etc. Then, the consumer NF may start communication with the producer NF accordingly. When there is more than one producer NF, the NRF may provide a list of available and possible producer NFs to the consumer NF, and the consumer NF may select which producer NF with which it is to communicate.

However, the behavior of the consumer NF may be vender dependent. For some vendors, the consumer NF is designated to be responsible to achieve load balancing and to distribute traffic among all the producer NFs. In this case, however, every NF must be integrated with this load balancing feature. Further, if any of the producer NFs fail, the communication will continue to fail until the consumer NF detects the failure. When the consumer NF detects the failure, the consumer NF will send a message to another NF, which adds more latency to the 5G core network. Furthermore, other vendors may not include any load balancing features, and the communications will fail entirely without any attempt to communicate with another producer NF. Provided herein are system, methods and devices that improve communication message forwarding and control, load balancing, and failure management among NFs in an SBA.

Figure 5:
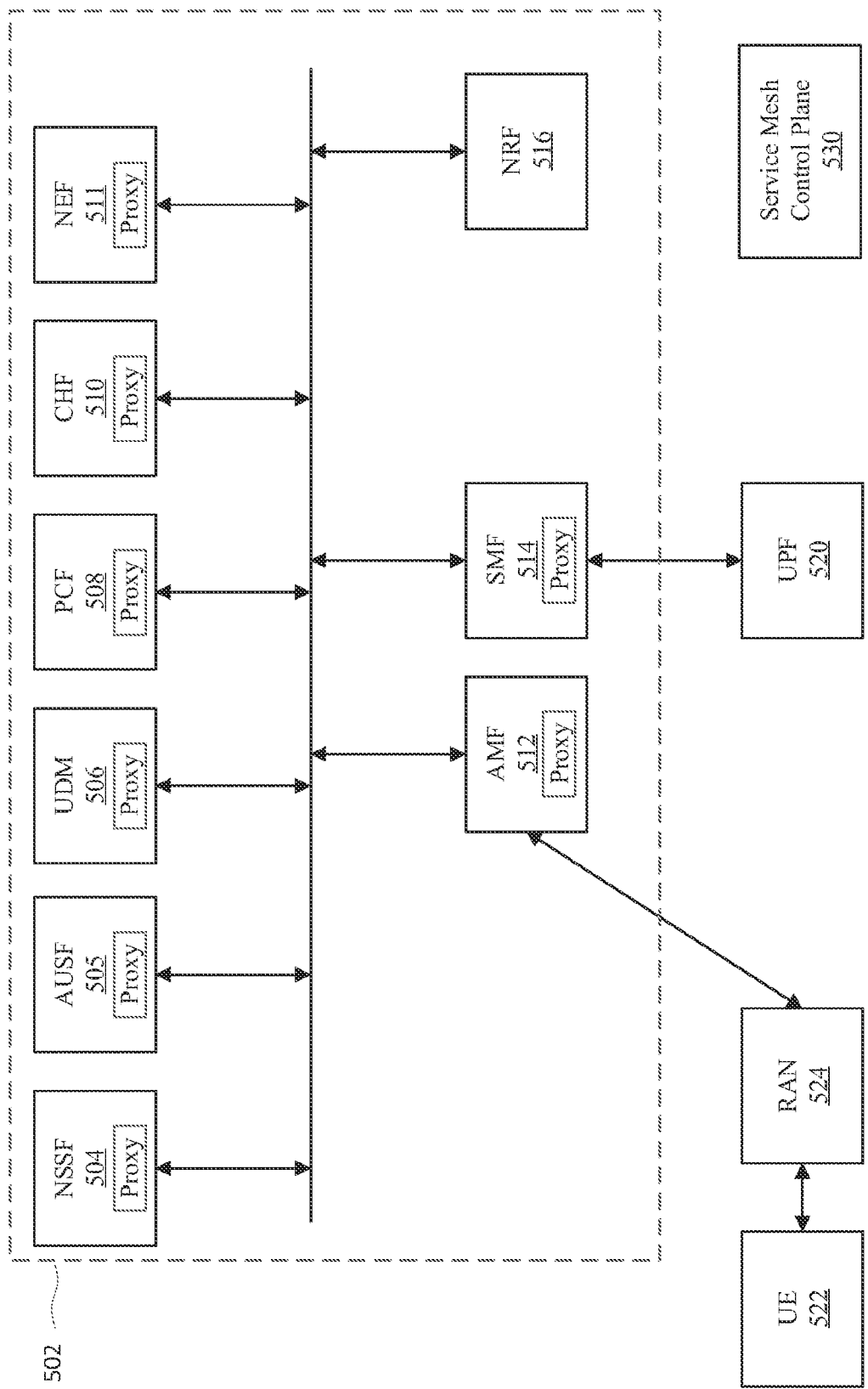
FIG. 5 is a diagram of a 5G core 3GPP SBA integrated with a service mesh.

FIG. 5 is a diagram of a 5G core 3GPP SBA that incorporates a service mesh. The SBA 502 may include, for example, a plurality of NFs, such as an NSSF 504, a AUSF 505, a UDM 506, a PCF 508, a CHF 510, a NEF 511, an AMF 512, and an SMF 514. It will be understood by one of ordinary skill in the art that the examples disclosed herein are not limited to the particular depicted NFs, as an SBA may include additional or alternative NFs. The SMF 514 may be in communication with a UPF 520, and a UE 522 may be in communication with the SBA 502 via a RAN 524. The SBA 502 includes an NRF 516.

The SBA 502 in FIG. 5 integrates a service mesh which is a software component in a cloud infrastructure. The service mesh includes two basic architectural components: a data plane that is an interconnected set or mesh of proxies that may be deployed as separate proxy or as a sidecar along with each service deployment (e.g., each NF) and through which traffic is forwarded; and a control plane 530 configured to control the proxies and provide policy and configuration for all of the running data planes in the mesh. The SBA 502 in FIG. 5 integrates the service mesh by modifying or incorporating a proxy in each NF, and by integrating the service mesh control plane 530 to control the proxies' behavior across the mesh. Further, the service mesh may be configured to perform security encryption, load balancing, and other network management functions. However, the service mesh control plane 530 may perform load balancing among NFs according to the NFs' states in a cloud infrastructure regardless of any of the other factors or parameters that the NRF 516 has been provided with, such as capacity, loading, priority, etc. For example, the service mesh control plane 530 may not consider any information regarding whether the NFs have equal capacity or whether the NFs are loaded.

Figure 6:
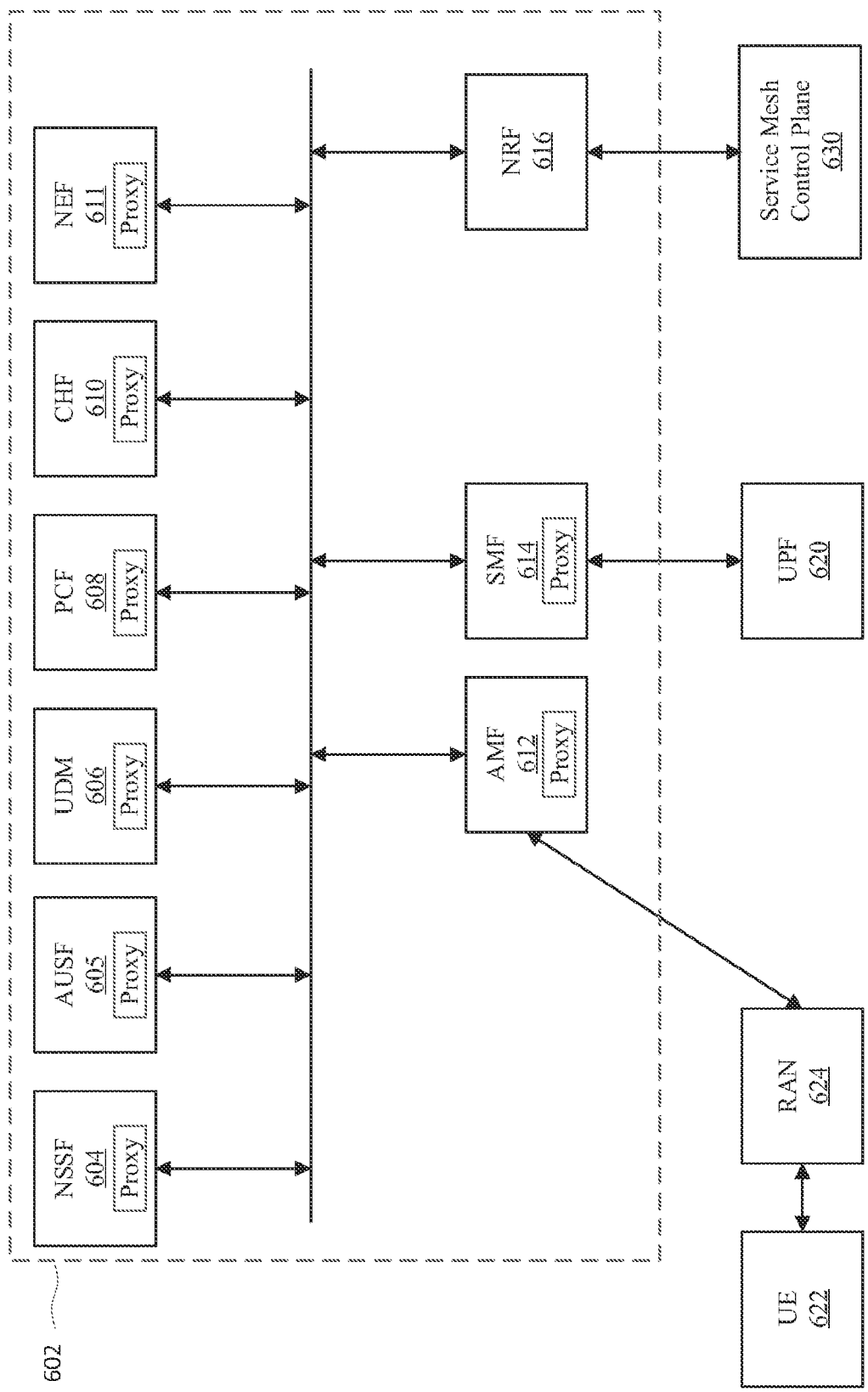
FIG. 6 is a diagram of a 5G core 3GPP SBA with an integrated service mesh, according to an embodiment.

FIG. 6 is a diagram of a 5G core 3GPP SBA 602 with an integrated service mesh, according to an embodiment. The SBA 602 may include, for example, a plurality of NFs, such as an NSSF 604, a AUSF 605, a UDM 606, a PCF 608, a CHF 610, a NEF 611, an AMF 612, and an SMF 614. It will be understood by one of ordinary skill in the art that the examples disclosed herein are not limited to the particular depicted NFs, as an SBA may include additional or alternative NFs. The SMF 614 may be in communication with a UPF 620, and a UE 622 may be in communication with the SBA 602 via a RAN 624. The SBA 602 includes an NRF 616.

A service mesh control plane 630 is provided and integrated with the NRF 616 to perform load balancing among the NFs. For example, once the NRF 616 receives the registration information (e.g., information regarding the capabilities of the NFs, such as capacity, loading, priority, etc.), the NRF 616 may perform load balance prioritization of the NFs and generate load balance prioritization information based on the registration information. The load balance prioritization information may include information on priority and instructions on how to load balance between the NFs. The NRF 616 may send the load balance prioritization information to the service mesh control plane 630 such that the service mesh control plane 630 may perform load balancing for the NFs (e.g., via the proxies) based on the load balance prioritization information. When the NRF 616 detects any failure, the NRF 616 may update the load balance prioritization information and send the updated load balance prioritization information to the service mesh control plane 630 so that the service mesh control plane 630 may adjust the load balancing based on the known failure, thereby avoiding any extra latency in load balance correction.

By integrating the service mesh control plane 630 with the NRF 616, the system may be implemented with reduced costs since the load balancing function is performed by the service mesh control plane 630 and therefore, vendors of the 5G NFs do not have to include a load balancing feature in the NF. Moreover, by offloading load balancing from the NFs to the service mesh integrated with the NRF, the NFs can achieve uniformity in terms of capability irrespective of vendor. Furthermore, the implementation provides better performance by reducing latency in the case of communication failure. Additionally, by integrating or communicably connecting the NRF 616 with the service mesh control plane 630, the load balancing is both simplified and optimized (by being able to consider additional factors known or maintained by the NRF, such as capacity, loading, priority, etc.).

Figure 7:
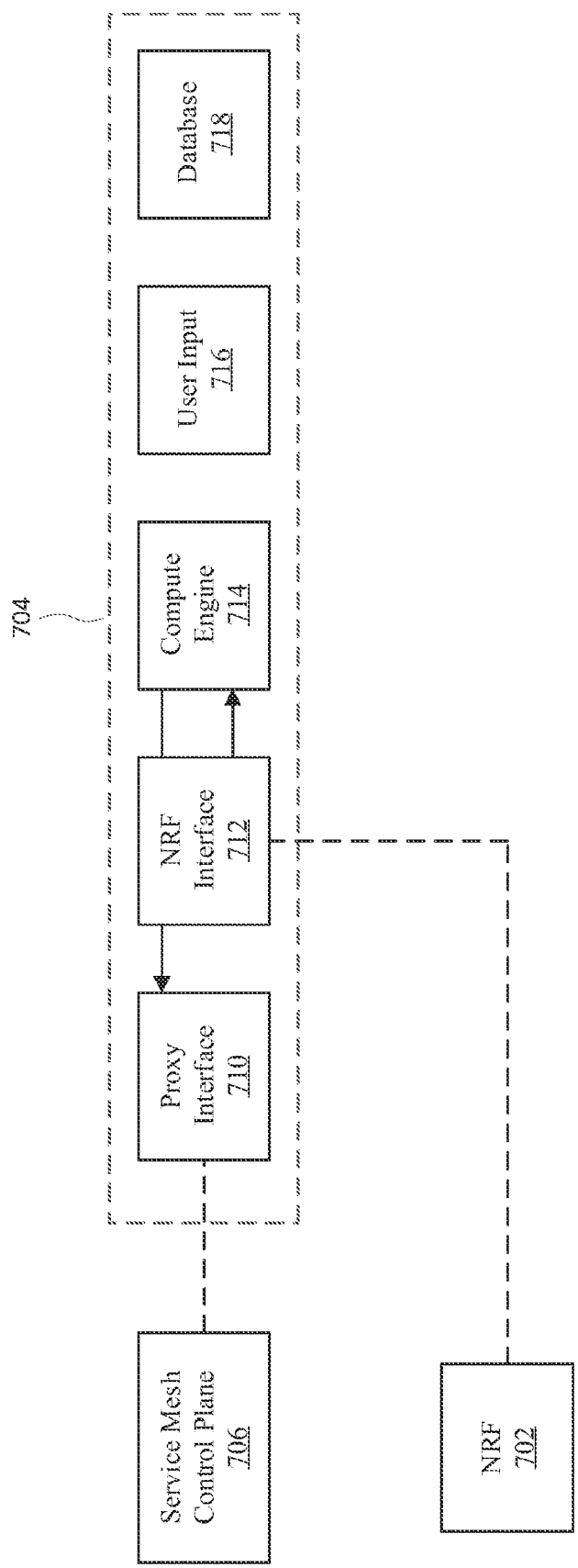
FIG. 7 is a diagram of an example implementation of a service mesh control plane with a network repository function (NRF), according to an embodiment.

FIG. 7 is a diagram of an example implementation of a service mesh control plane integrated with an NRF, according to an embodiment. The system in FIG. 7 may include an NRF 702, an integration component 704, and a service mesh control plane 706 in communication with the NRF 702 via the integration component 704. The integration component

704 may include a proxy interface 710, an NRF interface 712, a compute engine 714, a user input component 716 and a database 718.

When the NRF 706 generates load balance prioritization information, the NRF 702 provides the load balance prioritization information to the integration component 704 via the NRF interface 712. The compute engine 714 may receive the load balance prioritization information and may determine the load balancing parameters based on the load balance prioritization information. The compute engine 714 may further determine the load balancing parameters based on information stored in the database 718 as well as a setting received from a user input via the user input component 716. When the integration component 704 generates the load balancing parameters, the integration component sends the load balancing parameters to the service mesh control plain 706 via the proxy interface 710 so that load balancing can be performed.

Figure 8:
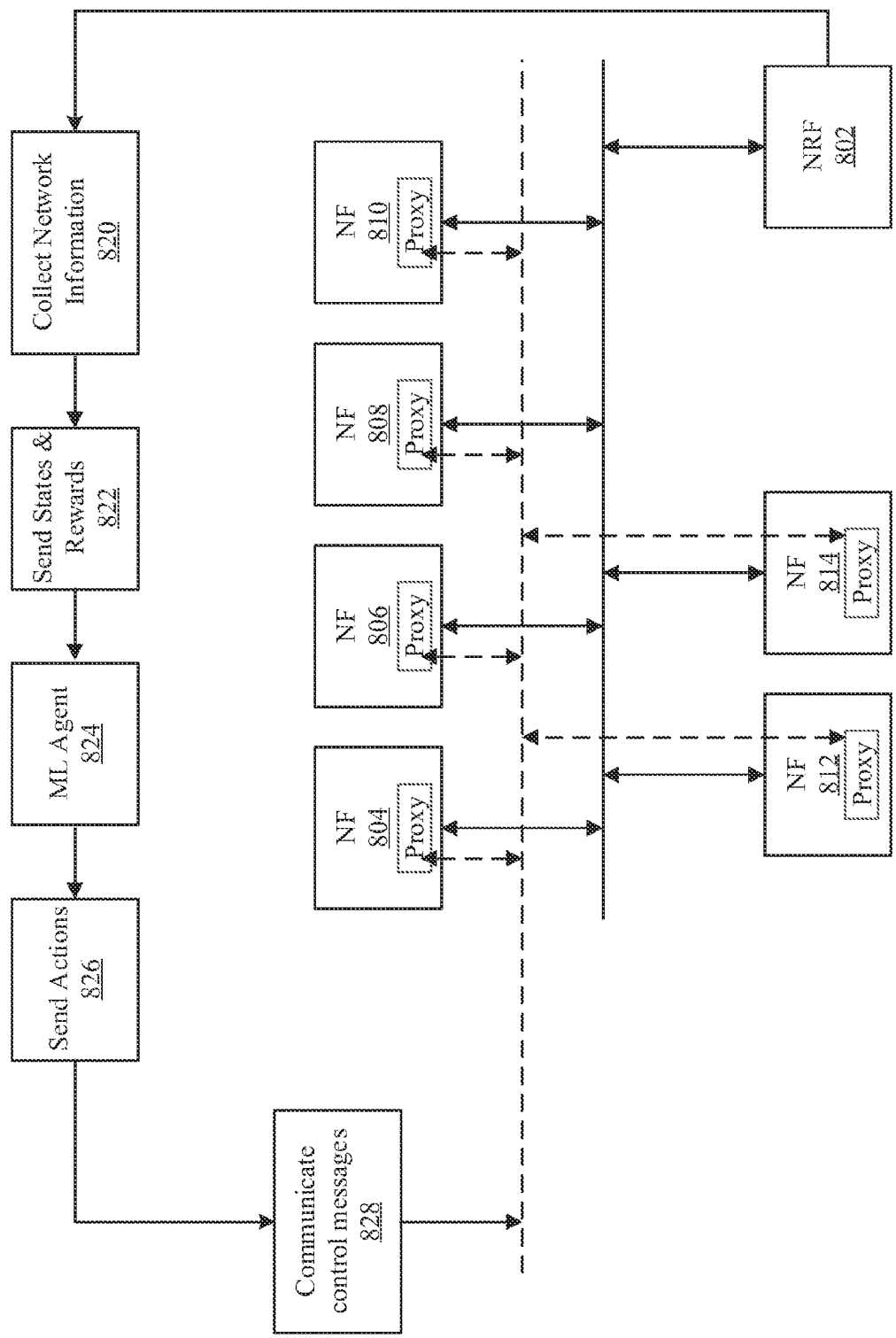
FIG. 8 is a diagram of an example machine learning (ML) implementation of a service mesh control plane with an NRF, according to an embodiment.

FIG. 8 is a diagram of an example machine learning (ML) implementation of a service mesh control plane integrated with an NRF, according to an embodiment. Referring to FIG. 8, the SBA may include an NRF 802 and a plurality of NFs 804-814 such as those described above. In one embodiment, NF 804 and NF 806 are UDM NFs. At block 820, the system may collect network information from the NRF 802. At block 822, the system may send states and rewards to an ML agent. At block 824, the ML agent may determine rewards and Q-values. At block 826, the system may send actions with the highest rewards or based on other conditions. At block 828, the system may communicate control messages via application programming interfaces (APIs) to the proxies of the NFs 804-814. Blocks 822, 824 and 826 may be implemented by a compute engine, such as compute engine 714 of FIG. 7.

The ML agent may control the system, as it sets actions based on the states collected from the environments. A state (S) may refer to information that represents characteristics of a destination NF, such as a function name, locality, priority, utilization (i.e., system loading over capacity) availability, etc. The reward (R) may represent the quality of an action taken by the ML agent (i.e., how good or how bad the action is) The reward may be a function of state and action, and the role of the ML agent may be to select actions to maximize rewards. The action (A) represents all possible and valid actions given a state S.

Figure 9:
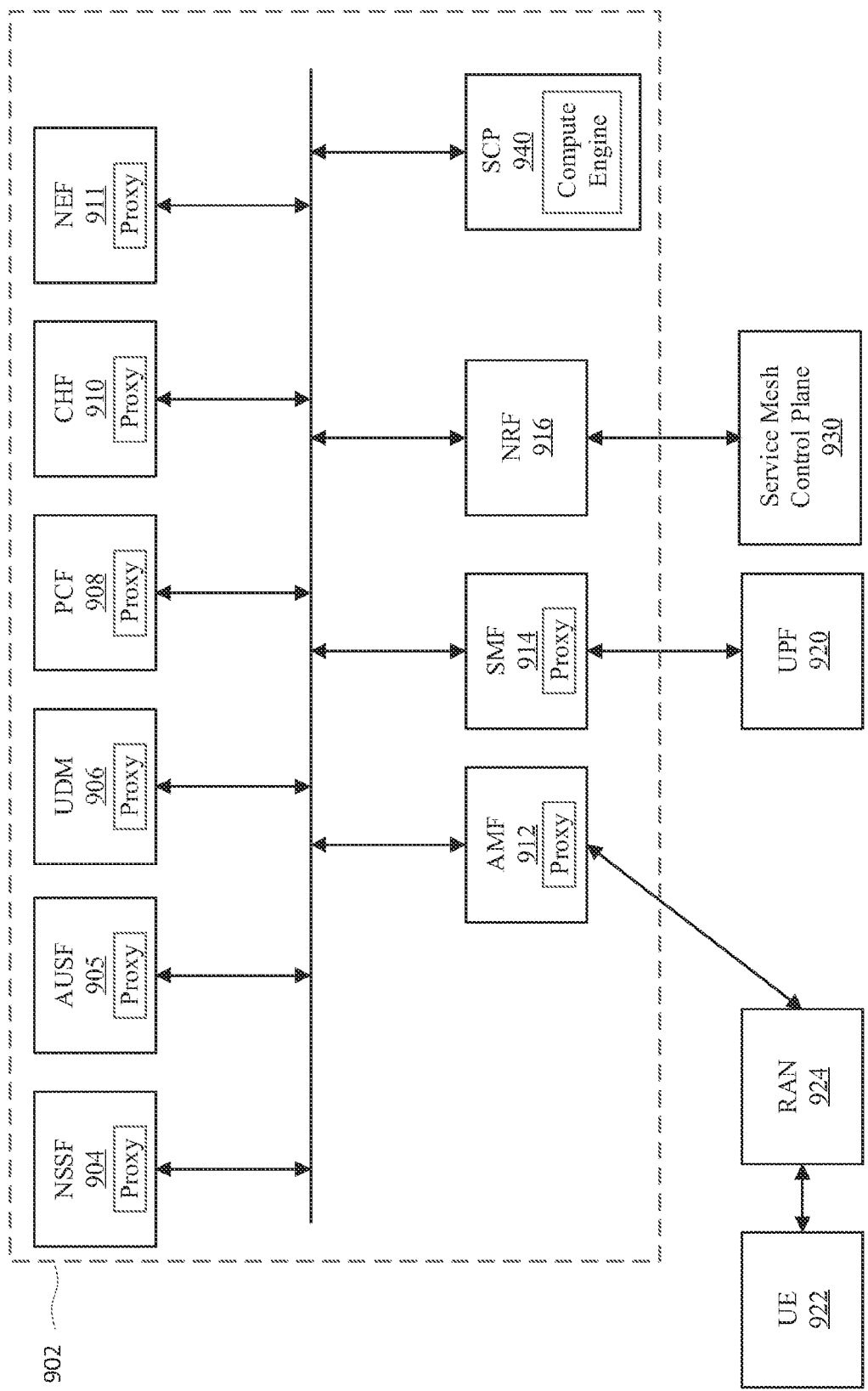
FIG. 9 is a diagram of a 5G core 3GPP SBA with an integrated service mesh, according to an embodiment.

FIG. 9 is a diagram of a 5G core 3GPP SBA 902 with an integrated service mesh, according to an embodiment. The SBA 902 may include, for example, a plurality of NFs, such as an NSSF 904, a AUSF 905, a UDM 906, a PCF 908, a CHF 910, a NEF 911, an AMF 912, and an SMF 914. It will be understood by one of ordinary skill in the art that the examples disclosed herein are not limited to the particular depicted NFs, as an SBA may include additional or alternative NFs. The SMF 914 may be in communication with a UPF 920, and a UE 922 may be in communication with the SBA 902 via a RAN 924. The SBA 902 includes an NRF 916. The NRF 916 is integrated with a service mesh control plane 930, as is described above. The SBA 902 also includes an SCP 940 that includes a compute engine. The compute engine may include an ML capability described above with respect to FIG. 8 that may be implemented as part of the SCP 940.

Figure 10:
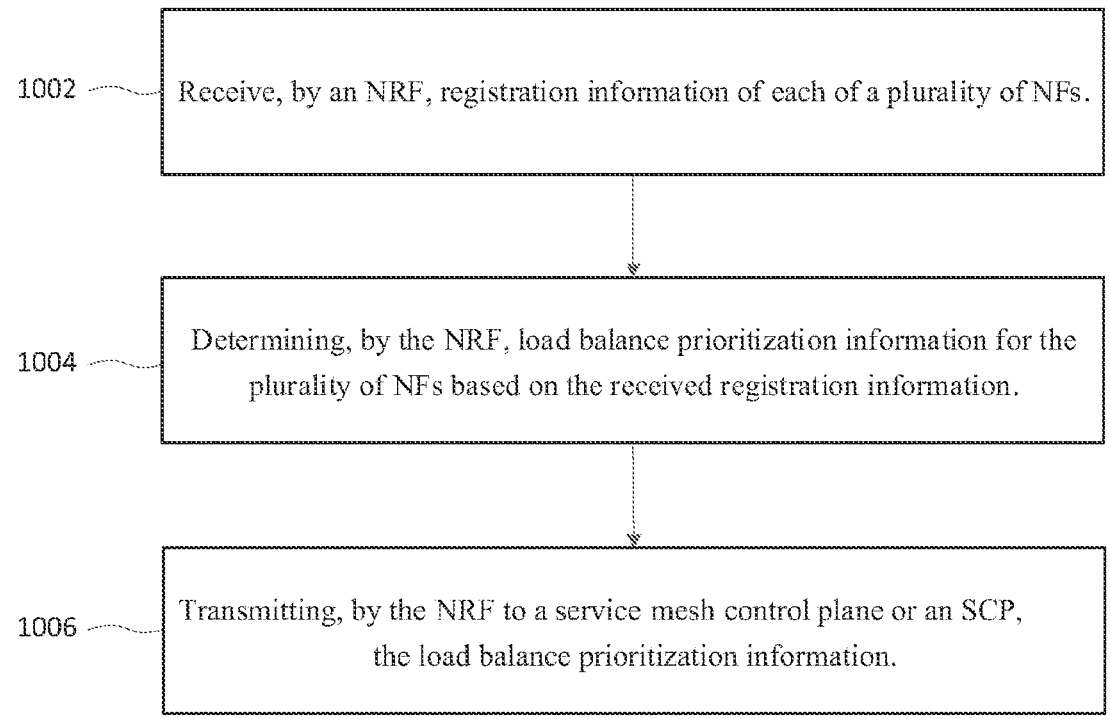
FIG. 10 is a flowchart of a method for communication forwarding and control and load balancing in an SBA, according to an embodiment.

FIG. 10 is a flowchart of a method for communication forwarding and control and load balancing in an SBA, according to an embodiment. Referring to FIG. 10, in operation 1002, the system receives, by an NRF, registration information of each of a plurality of NFs. In operation 1004, the system determines, by the NRF, load balance prioritization information for the plurality of NFs based on the received registration information. In operation 1006, the system transmits, by the NRF to a service mesh control plane or an SCP, the load balance prioritization information. The service mesh control plane may be configured to perform load balancing on the plurality of NFs based on the load balance prioritization information. The service mesh control plane or SCP may include an integrated ML agent to determine the actions of message forwarding using machine learning.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a network repository function (NRF), registration information of each of a plurality of network functions (NFs);
   determining, by the NRF, load balance prioritization information for the plurality of NFs based on the received registration information;
   detecting, by the NRF, whether a failure occurs in at least one of the plurality of NFs; and
   in response to detecting a failure in at least one of the plurality of NFs:
      transmitting, by the NRF to a Service Communication Proxy (SCP) with Machine Learning, the load balance prioritization information;

receiving, by a compute engine of an integration component, the load balance prioritization information from the NRF, the compute engine comprising a Machine Learning agent;

determining, by the compute engine comprising the Machine Learning agent, at least one load balance parameter based on the load balancing prioritization information; and transmitting, by the integration component to a service mesh control plane, the at least one load balance parameter, wherein the service mesh control plane is configured to perform load balancing on the plurality of NFs based on the at least one load balance parameter.

2. The method of claim 1, wherein the plurality of NFs comprises at least one of an application management function (AMF), a session management function (SMF), a network slice selection function (NSSF), an authentication server function (AUSF), or a policy control function (PCF).

3. The method of claim 1, wherein the registration information comprises information on at least one of an internet protocol (IP) address, location, priority, capacity, loading, or services of a NF.

4. The method of claim 1, wherein the service mesh control plane is configured to perform load balancing on the plurality of NFs by a service mesh proxy on each of the plurality of NFs.

5. A system, comprising:
a plurality of network functions (NFs);
a network repository function (NRF); and
a service mesh control plane,
wherein the NRF is configured to:
    receive registration information of each of the plurality of NFs;
    determine load balance prioritization information for the plurality of NFs based on the received registration information;
    detect whether a failure occurs in at least one of the plurality of NFs; and
    in response to detecting a failure in at least one of the plurality of NFs, transmit, to Service Communication Proxy (SCP) with Machine Learning, the load balance prioritization information;
wherein the SCP with Machine Learning is configured to:
    receive, by a compute engine of an integration component, the load balance prioritization information from the NRF, the compute engine comprising a Machine Learning agent;
    determine, by the compute engine comprising the Machine Learning agent, at least one load balance parameter based on the load balancing prioritization information; and
    transmit, by the integration component to the service mesh control plane, the at least one load balance parameter, and wherein the service mesh control plane is configured to perform load balancing on the plurality of NFs based on the at least one load balance parameter.

6. The system of claim 5, wherein the plurality of NFs comprises at least one of an application management function (AMF), a session management function (SMF), a network slice selection function (NSSF), an authentication server function (AUSF), or a policy control function (PCF).

7. The system of claim 5, wherein the registration information comprises information on at least one of an internet protocol (IP) address, location, priority, capacity, loading, or services of a NF.

8. The system of claim 5, wherein the service mesh control plane is further configured to perform load balancing on the plurality of NFs by a service mesh proxy on each of the plurality of NFs.

9. A non-transitory computer readable storage medium, the storage medium connected to one or more processors and storing instructions that, when executed, cause the one or more processors to:
    receive, by a network repository function (NRF), registration information of each of a plurality of network functions (NFs);
    determine, by the NRF, load balance prioritization information for the plurality of NFs based on the received registration information;
    detect, by the NRF, whether a failure occurs in at least one of the plurality of NFs; and
    in response to detecting a failure in at least one of the plurality of NFs:
        transmit, by the NRF to a Service Communication Proxy (SCP) with Machine Learning, the load balance prioritization information;
        receive, by a compute engine of an integration component, the load balance prioritization information from the NRF, the compute engine comprising a Machine Learning agent;
        determine, by the compute engine comprising the Machine Learning agent, at least one load balance parameter based on the load balancing prioritization information; and
        transmit, by the integration component to a service mesh control plane, the at least one load balance parameter,
    wherein the service mesh control plane is configured to perform load balancing on the plurality of NFs based on the at least one load balance parameter.

10. The storage medium of claim 9, wherein the plurality of NFs comprises at least one of an application management function (AMF), a session management function (SMF), a network slice selection function (NSSF), an authentication server function (AUSF), or a policy control function (PCF).

11. The storage medium of claim 9, wherein the registration information comprises information on at least one of an internet protocol (IP) address, location, priority, capacity, loading, or services of a NF.

* * * * *